United States Patent [19]

Matsuoka et al.

[11] Patent Number: 5,054,448

[45] Date of Patent: Oct. 8, 1991

[54] KNOCKING SUPPRESSION APPARATUS FOR AN INTERNAL COMBUSTION ENGINE

[75] Inventors: Atsuko Matsuoka; Toshio Iwata, both of Himeji, Japan

[73] Assignee: Mitsubishi Denki Kabushiki Kaisha, Tokyo, Japan

[21] Appl. No.: 489,622

[22] Filed: Mar. 7, 1990

[30] Foreign Application Priority Data

| Mar. 8, 1989 | [JP] | Japan | 1-53872 |
| Mar. 8, 1989 | [JP] | Japan | 1-53873 |
| Apr. 28, 1989 | [JP] | Japan | 1-107689 |

[51] Int. Cl.⁵ ............................................. F02P 5/15
[52] U.S. Cl. .............................. 123/425; 364/431.08
[58] Field of Search ................... 123/425, 435, 417; 364/431.08; 73/35

[56] References Cited

U.S. PATENT DOCUMENTS

| 4,501,137 | 2/1985 | Aoki et al. | 123/425 |
| 4,633,835 | 1/1987 | Akasu | 123/425 |
| 4,699,106 | 10/1987 | Haraguchi et al. | 123/425 |
| 4,766,545 | 8/1988 | Nagai | 364/431.08 |

FOREIGN PATENT DOCUMENTS 58-135435 8/1983 Japan ..................................... 73/35

Primary Examiner—Andrew M. Dolinar
Attorney, Agent, or Firm—Sughrue, Mion, Zinn, Macpeak and Seas

[57] ABSTRACT

An improved knocking suppression apparatus for an internal combustion engine is able to determine whether there is knocking in the engine through a microcomputer, reduce the load on the electric circuits employed and simplify the arrangement thereof. A knock interface circuit including a peak holding circuit and an averaging circuit is connected to receive the output signal of a knock sensor for generating a peak-hold signal ($V_P$) representative of a peak in the knock sensor output signal and for generating an average signasl ($V_A$) representative of an average of the knock sensor output signal. A microcomputer, based on the average signal ($V_A$), sets a threshold level ($V_{TH}$) and makes a comparison between the peak-hold signal ($V_P$) and the threshold level ($V_{TH}$) to determine when knocking occurs. An ignition timing controller retards the ignition timing as the number of revolutions per minute of the engine increases. The ignition timing controller includes a retard angle modifying means for modifying the retard angle ($\theta_R$) based on the output signal ($V_K$) of the knocking determining means (in the microcomputer) and retards the ignition timing based on the thus modified retard angle ($\theta_R'$) so as to suppress knocking. Preferably, a failure determining means determines whether there is a failure in the knock sensor, and the retard angle modifying means stops the retard angle modification when the failure determining means detects such a failure.

13 Claims, 9 Drawing Sheets

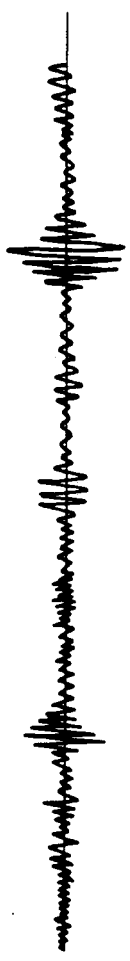
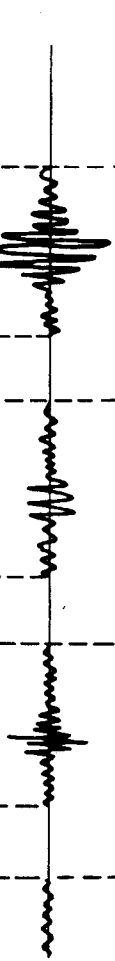
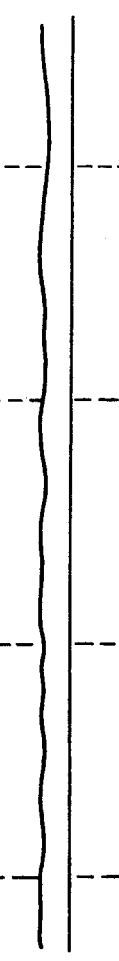
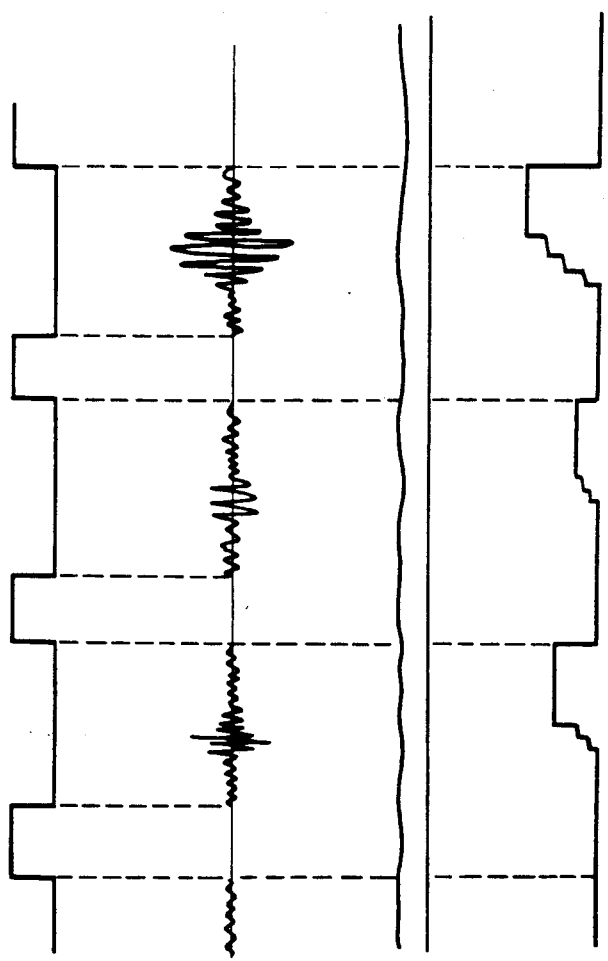
FIG. 9(a) OUTPUT SIGNAL OF KNOCK SENSOR (100) PRIOR ART
FIG. 9(b) MASK SIGNAL PRIOR ART
FIG. 9(c) OUTPUT SIGNAL OF GATE CIRCUIT (23) PRIOR ART
FIG. 9(d) OUTPUT SIGNAL OF BGL CIRCUIT (24) PRIOR ART
FIG. 9(e) OUTPUT SIGNAL OF INTEGRATOR (26) PRIOR ART

KNOCKING SUPPRESSION APPARATUS FOR AN INTERNAL COMBUSTION ENGINE

BACKGROUND OF THE INVENTION

The present invention relates to a knocking suppression apparatus for an internal combustion engine. More particularly, it relates to a knocking suppression apparatus having an ignition timing controller for controlling the ignition timing in such a manner as to suppress knocking.

FIG. 8 shows a typical conventional knocking suppression apparatus for an internal combustion engine of such a type which comprises a knock sensor 1 in the form of an acceleration sensor and the like installed on an engine for sensing knocking in the engine, e.g., for Sensing engine accelerations due to knocking and generating a corresponding electrical output signal a knock detecting circuit 2 for of a knock sensor 1 and generating an output signal of an analog form when knocking is detected, an analog to digital (A/D) converter 3 for converting the analog output signal of the knocking detecting circuit 2 into a digital signal, and a microcomputer 4 including an ignition timing controller 5 connected to a receive the digital signal from the A/D converter 3 for controlling the ignition timing of the engine in an appropriate manner so as to suppress knocking int he engine. The knocking detecting circuit 2 includes a band-pass filter 22 for filtering a particular frequency band of he output signal of the knock sensor 1, a gate circuit 23 operable through the action of a mask signal from the microcomputer 4 to pass specific portions of the output signal of the band pass filter 22, a BGL circuit 24 connected to receive the output signal of the gate circuit 23 for generating an output signal of a background voltage level, a comparator 25 having a first input terminal connected to receive the output signal of the gate circuit 23 and a second input terminal which is supplied with the output signal of the BGL circuit 24 for making a comparison between these input signals, and an integrator 26 having an input terminal coupled to the output terminal of the comparator 25 and an output terminal coupled to the input terminal of the A/D converter 3 for integrating the output signal of the comparator 25 and outputting an analog signal, the integrator 26 further having a reset terminal coupled to the microcomputer 4 such that it is reset by a reset signal from the microcomputer 4.

The conventional knocking suppression apparatus as constructed above operates as follows. First, the knock sensor 1 generates an output signal, as illustrated in FIG. 9(a), which is input to the band-pass filer 22 where a specific frequency band thereof is filtered and passed to the gate circuit 23. The gate circuit 23, which has a gate control terminal supplied from the microcomputer 4 with a mask signal containing square pulses occurring at predetermined intervals as illustrated in FIG. 9(b), operates to mask the output signal of the knock sensor 1 as filtered through the band-pass filter 2 in such a manner that those portions of the knock sensor output which correspond to the square pulses of the mask signal are removed to provide an output signal which contains no pulse at locates corresponding to the respective square pulses, as illustrated in FIG. 9(c). The output signal of the gate circuit 23 is input to the first input terminal of the comparator 25, and at the same time it is imposed on the input terminal of the BGL circuit 24 so that the BGL circuit 24 produces an output signal having a predetermined background voltage level, as illustrated in FIG. 9(d). The background level voltage of the BGL circuit 24 is imposed on the second input terminal of the comparator 25 and compared with the output signal of the gate circuit 23 which is fed to the first input terminal of the comparator 25 so that the comparator 25 generates an output signal when the output signal of the gate circuit 23 is higher than the background voltage level. The output signal of the comparator 25 is fed to the integrator 26 and subjected to integration. Thus, the integrator 26 generates an output signal which is shown in FIG. 9(e). In this regard, it is to be noted that although no illustrated in FIG. 8, in case of a multi-cylinder internal combustion engine, a plurality of knock sensors 1 are employed one for each engine cylinder, and the output signals of the respective knock sensors 1 are fed to the integrator 26 in a parallel relation with each other through the band-pass filter 22, the gate circuit 23 and the the comparator 25 so that they are respectively integrated by the integrator 26 to provide corresponding output signals as shown in FIG. 9(e). To this end, the microcomputer 4 feeds a reset signal for each knock sensor output to the reset terminal of the integrator 26 at an appropriate timing. The integrated output signal of the analog from of the integrator 26 is then fed to the A/D converter 3 and converted there into a digital signal $V_r$ which in turn is rad into the microcomputer 4 where based on the digital signal $V_r$, the ignition timing controller 5 calculates an appropriate knock-suppression retard angle $\Delta\theta_r$ using the following formula:

$$\Delta_{K4} = V_R \times N$$

where N is a modification coefficient.

With the above mentioned conventional knocking suppression apparatus, however, the hardware such as the knock detecting circuit 2 takes care of the entire signal processing of determining whether or not there is knocking in the engine. Such a processing requires a rather complicated circuit arrangement and a tremendous load on the part of the hardware, resulting in a high production cost.

SUMMARY OF THE INVENTION

Accordingly, the present invention is intended to obviate the above mentioned a problems of the prior art.

One object of the present invention is to provide a novel and improved knocking suppression apparatus for an internal combustion engine of the type described which is able to conduct the determination of knocking in the engine by means of a microcomputer, thereby reducing the load on the electric circuit employed and simplifying the arrangement thereof to a substantial extent.

Another object of ht present invention is to provide a novel and improved knocking suppression apparatus for an internal combustion engine of the type described which is able to sense a failure in a knock sensor in a reliable manner.

A further object of the present in mention is to provide a novel and improved knocking suppression apparatus for an internal combustion engine of the type described which is able to change the ignition timing from a retard-angle-modification ignition timing control mode for knocking suppression into an ordinary ignition timing control mode without knocking suppression when a failure in a knock sensor is sensed.

With the above objects in view, according the present invention, there is provided a knocking suppression apparatus for an internal combustion engine comprising:

a knock sensor mounted on an engine for sensing knocking therein;

a knock interface circuit connected to receive the output signal of the knock sensor for generating a peak-hold signal ($V_p$) representative of a peak in the knock sensor output signal and for generating an average signal ($V_A$) representative of an average of the knock sensor output signal; and a microcomputer including a threshold setting means for setting, based on the average signal ($V_A$), a threshold level ($V_{TH}$) for knocking determination, a knocking determining means for making a comparison between the peak-hold signal ($V_p$) and the threshold level ($V_{TH}$) and determining, gased on the result of ht comparison, whether there is knocking int he engine, and an ignition timing controller for controlling the ignition timing of the engine, the ignition timing controller including a retard angle modifying means for modifying the retard angle ($\theta_R$) based on the output signal ($V_K$) of the knocking determining means and retarding the ignition timing based on the thus modified retard angle ($\theta_R+$) so as to suppress the knocking.

The threshold determining means determines the threshold level ($V_{TH}$) as follows:

$$V_{TH} = V_A \times K + V_{ofs}$$

where K is a constant; and $V_{ofs}$ is an offset value.

The knocking determining means determines that there is knocking in the engine when the peak signal ($V_P$) is greater than the threshold signal ($V_{TH}$).

In one embodiment, the retard angel control means calculates an appropriate quantity of retard angle modification ($\iota\theta_R$) based on a difference ($V_K$) between the peak-hold signal ($V_p$) and the threshold signal ($V_{TH}$) as follows:

$$\Delta\theta_R = V_K \times L \times (V_p - V_{TH}) \times L$$

where AL is a coefficient of modification.

In another embodiment, a difference ($V_K$) between the peak-hold signal ($V_p$) and the threshold signal ($V_{TH}$) increases as the number of revolutions per minute of the engine increases, and the retard angle control means calculates an appropriate quantity of retard angle modification ($\Delta\theta_R$) by normalizing the difference ($V_K$) by the threshold signal ($V_{TH}$) as follows:

$$\Delta\theta_R \times V_K \times (L'/V_{TH}) = (V_P - V_{TH}) \times (L'/V_{TH})$$

where L' is = a coefficient of modification.

The retard angel control means modifies the retard angle ($\theta_R$) in the following manner to provide the modified retard angle ($\theta_R'$):

$$\theta_R' = \theta_R + \Delta\theta_R.$$

In a further embodiment, the knocking suppression apparatus further comprises failure determining means for determining whether there is a failure in the knock sensor.

In an embodiment, the failure determining means is connected to receive the average signal ($V_A$) of the a averaging means and determines that there is a figure in the knock sensor when the average signal ($V_AZ$) is less than a prescribed reference level ($V_{AF}$).

In another embodiment, the failure determining means is connected to receive the threshold signal ($V_{TH}$) of the threshold determining means and determines that there is a failure in the knock sensor when the threshold signal $V_{TH}$) is less than a prescribed reference level ($V_{AF}$).

Preferably, the retard angle modifying means stops the retard angle modification only after the failure determining means determines a prescribed number of times that there is a failure int he knock sensor.

The knocking suppression apparatus may further comprise a rotation sensor for sensing the number of revolutions per minute of the engine, and the failure determining means performs the failure determination only when the number of revolutions per minute of the engine as sensed by the rotation sensor falls within a specified range.

The above and other objects, features and advantages of the present invention will become more readily apparent from the following detailed description of a few presently preferred embodiments thereof taken in conjunction with the accompanying drawings.

BRIEF DESCRIPTION OF THE DRAWINGS

FIG. 9(a) is a waveform diagram of the output signal of a knock sensor of FIG. 8;

FIG. 9(b) is a waveform diagram of a mask signal inputted to a gate control terminal of a gate circuit of FIG. 8;

FIG. 9(c) is a waveform diagram of the output signal of the gate circuit of FIG. 8;

FIG. 9(d) is a waveform diagram of the output signal of a BGL circuit of FIG. 8; and FIG. 9(e) is a waveform diagram of the output signal of an integrator of FIG. 8.

DETAILED DESCRIPTION OF THE PREFERRED EMBODIMENTS

The present invention will now be described in detail with reference to a few preferred embodiments thereof as illustrated in the accompanying drawings.

Figure 1:
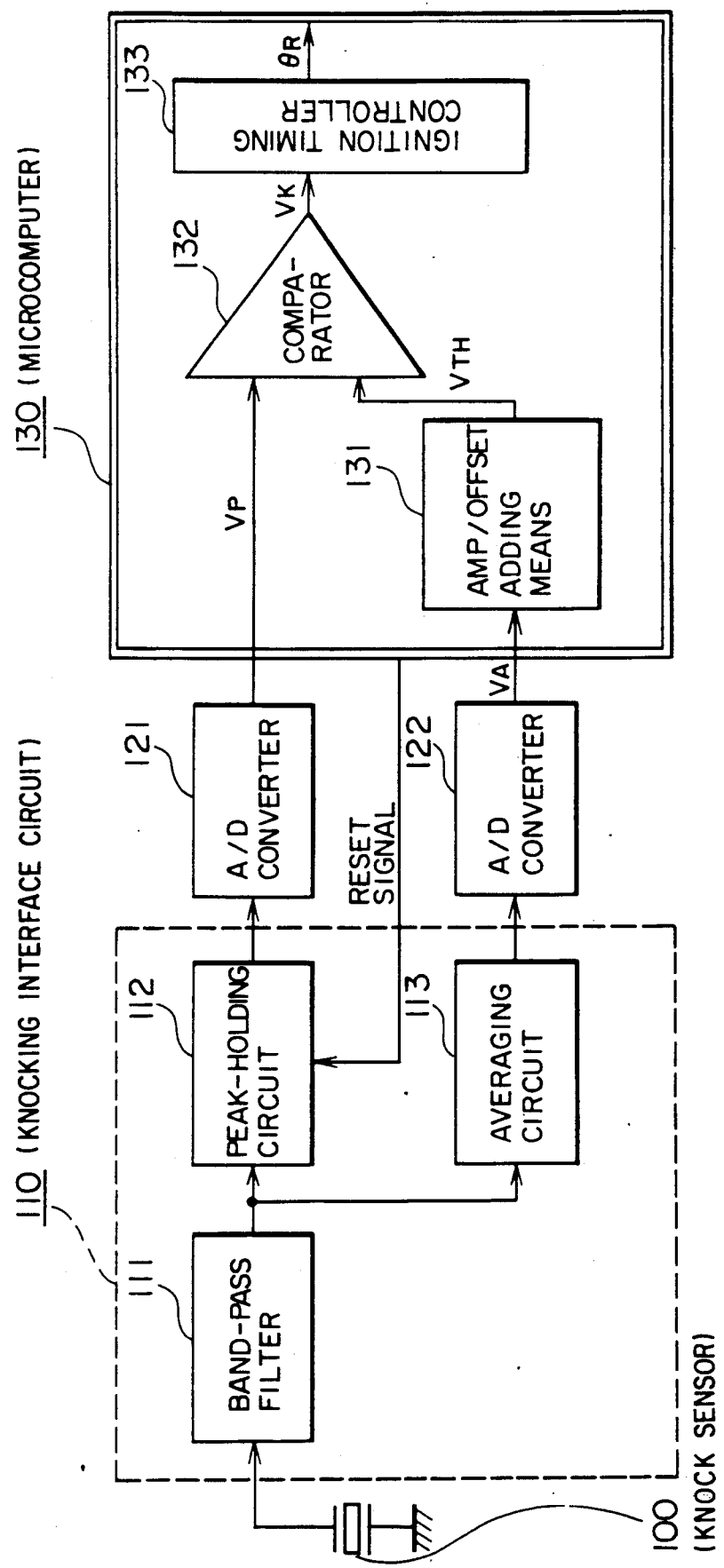
FIG. 1 is a block diagram of a knocking suppression apparatus for an internal combustion engine in accordance with a first embodiment of the present invention.

Referring to the drawings and first to FIG. 1, there is shown the general arrangement of a knocking suppression apparatus for an internal combustion engine constructed in accordance with a first embodiment of the present invention. The knocking suppression apparatus illustrated includes a knock sensor 100, a knock interface circuit 110, first and second A/D converters 121, 122, and a microcomputer 130.

Figure 2:
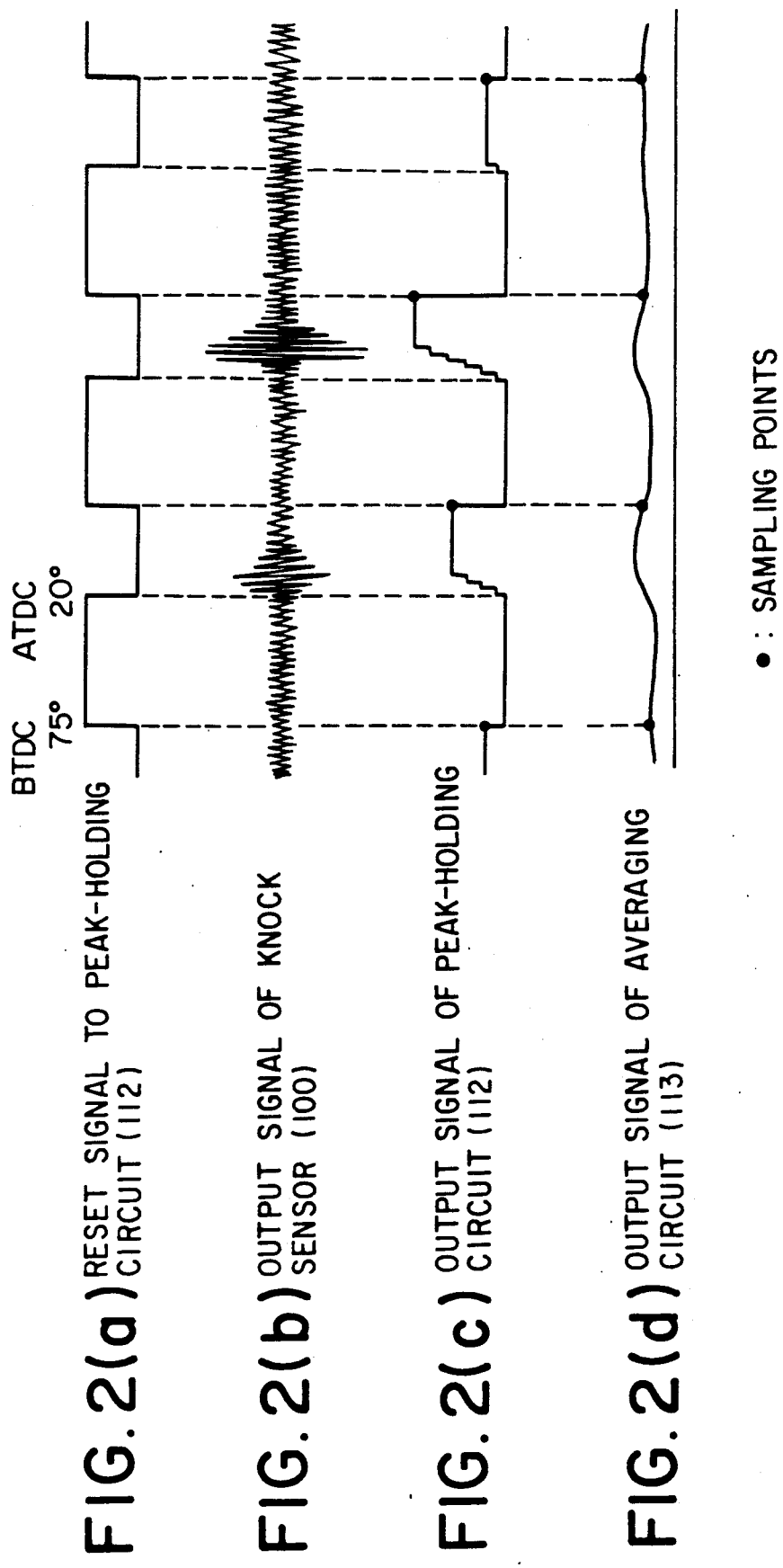
FIG. 2(a) is a waveform diagram of a reset signal inputted to a peak-holding circuit of FIG. 1.
FIG. 2(b) is a waveform diagram of the output signal
FIG. 2(c) is a waveform diagram of the output signal of the peak-holding circuit of FIG. 1.
FIG. 2(d) is a waveform diagram of the output signal of an averaging circuit of FIG. 1.

The knock sensor 100 such as an acceleration sensor, etc., is installed on an engine for sensing knocking therein and generating an output signal of high frequencies, as illustrated in FIG. 2(b), for sensing knocking in the engine.

The knock interface circuit 110 comprises a band pass filter 111 connected at its input terminal to the knock sensor 100 for filtering a particular frequency band of the output signal of the knock sensor 100, a peak-holding circuit 112 having an input terminal coupled to the output terminal of the band-pass filter 111 for generating a peak signal with an amplitude corresponding to each peak of the output signal of the knock sensor 100 as filtered by the band-pass filter 111, and an averaging circuit 113 connected to receive the output signal of the band-pass filter 111 so as to generate an average signal which is, for example, illustrated in FIG. 2(d). The peak-holding circuit 112 also has a reset input terminal onto which a reset signal is imposed by the microcomputer 130. The reset signal generated by the microcomputer 130 has, for example, a square wave form, as illustrated in FIG. 2(a), which has a rising edge occurring at a crank angle (i.e., angular piston position) of 75 degrees before top dead center (BTDC) and a falling edge occurring at a crank angle of 20 degrees after top dead center (ATDC). Thus, the reset signal fed to the reset input terminal of the peak-holding circuit 112 is at the high level only during a period from 75 degrees BTDC to 20 degrees ATDC which substantially corresponds to the time when there is no knocking in the engine. The peak-holding circuit 112 receives the output signal of the knock sensor 100 band filtered by the band-pass filter 111 and generates an output signal in the form of a peak-hold signal having generally stepped wave forms, as illustrated in FIG. 2(c), each of which rises stepwise in response to an increased amplitude of each pulse of the knock sensor output signal and is held at the peak level as long as the reset signal is at the low level, and falls vertically when the reset signal changes from the low to the high level.

The first A/D converter 121 receives the output signal in the form of an analog signal from the peak-holding circuit 112 and converts is into a corresponding digital signal $V_p$. Also, the second A/D converter 122 receives the output signal in the form of an analog signal from the averaging circuit 113 and converts it into a corresponding digital signal $V_A$.

The microcomputer 130 comprises a threshold setting means 131 (hereinafter abbreviated as an amp/offset adding means) for setting, based on the digital average signal $V_A$, a threshold level $V_{TH}$ for determining a failure in the knock sensor, a knocking determining means 132 for making a comparison between the digital peak-hold signal $V_p$ and the threshold level $V_{TH}$ and determining, based on the result of the comparison, whether there is knocking in the engine, and an ignition timing controller 133 for controlling the ignition timing of the engine in such a manner that the ignition timing retards as the number of revolutions per minute of the engine increases.

The threshold setting means 131 takes the form of an amplifying and offset adding means (hereinafter abbreviated as an amp/offset adding means) which has an input terminal connected to receive the digital output signal $V_A$ of the second A/D converter 122, which is obtained from the analog output signal of the averaging circuit 113 through the analog to digital conversion, for amplifying and offset adding it to provide an output signal of a threshold voltage $V_{TH}$ which is to be used as a threshold level for determining whether there is knocking in the engine.

The knocking degenerating means 132 takes the form of a comparator which has a first input terminal connected to receive the digital output signal $V_P$ of the first A/D converter 121 and a second input terminal on which the output signal $V_{TH}$ of the threshold level of the amp/offset adding means 131 is imposed for making comparison therebetween. The comparator 132 determines that there is knocking in the engine when a difference $V_K$ between the output signal $V_P$ and the threshold level $V_{TH}$ is greater than zero ($V_K = V_p - V_{TH} > 0$).

The ignition timing controller 133 includes a retard angle modifying means connected to receive the output signal $V_K$ of the comparator 132 for generating an output signal $\theta_R$ which is fed to an ignition timing control circuit (not shown) including an ignition coil and a spark plug so as to control or retard the ignition timing to an appropriate extent.

Figure 3:
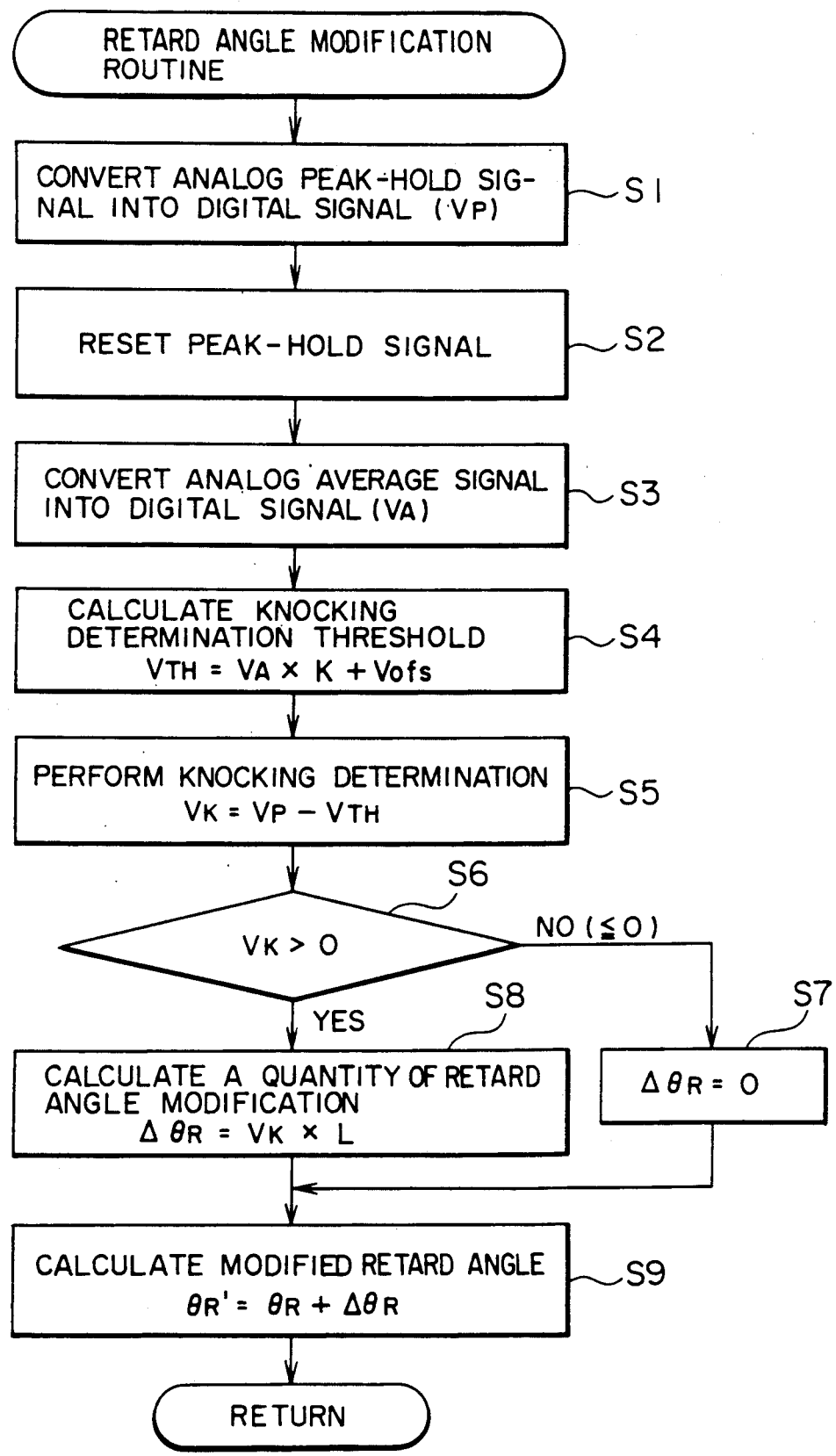
FIG. 3 is a flow chart showing the operation of a control program executed by a microcomputer of FIG. 1.

Description is not made of the operation of the knocking suppression apparatus as constructed above with particular reference to FIG. 3 which illustrates the operational steps of a control program which is stored and executed by the microcomputer 130 for controlling the knocking suppression apparatus of the invention.

First, in Step S1, the peak-hold signal in the form of an analog signal outputted from the peak-holding circuit 112 is converted by the first A/D converter 121 into a digital signal $V_p$. Then in Step S2, a reset signal is fed by the microcomputer 130 to the reset input terminal of the peak-holding circuit 112. In Step S3, the average signal in the form of an analog signal cf the averaging circuit 113 is converted by the second A/D converter 122 into a digital signal $V_A$ which is inputted to the amp/offset adding means 131 where it is amplified a prescribed number of times (e.g., K times) and added by an offset Vofs to provide a knocking determination threshold $V_{TH}$, that is $V_{TH} = V_A \times K + V_{ofs}$. Subsequently, in Step S 5, the comparator 132 makes comparison between the output signal $V_P$ of the first A/D converter 121, which has been obtained in Step S1 and inputted to the first input terminal thereof, and the knocking determination threshold $V_{TH}$ of the amp/offset adding means 131, which has been obtained in Step S4 and inputted to the second input terminal thereof, for determining whether there is knocking in the engine. In Step S6, if the result of the comparison ($V_K = V_p - V_{TH}$) is positive (i.e., $V_K > 0$), it is determined that there is knocking in the engine and then the program goes to Step S8 wherein retard angle modification control is effective by the retard angle modifying means 133, that is, an appropriate quantity of retard angle modification $\Delta\theta_R$ for modifying the retard angle $\theta_R$ for knocking suppression is calculated as follows:

$$\Delta\theta_R = V_K \times L = (V_p - V_{TH}) \times L$$

where L is a coefficient of modification.

On the other hand, if the result of the comparison is not positive (i.e., $V_K = V_p - V_{TH} \leq 0$), it is determined that there is no knocking and then the program goes to Step S7 wherein the quantity of retard angle modification $\Delta\theta_R$ is set to zero (i.e., $\Delta\theta_R = 0$). Thereafter, the program goes from Step S7 or S8 to Step S9 wherein an appropriate retard angle $\theta_R'$ for knocking suppression is calculated as follows:

$$\theta_R' = \theta_R + \Delta\theta_R$$

where $\theta_R$ is an ordinary retard angle without taking account of the knocking suppression.

Thereafter, the program returns to Step S1 and the same process steps are repeated as above.

Figure 4:
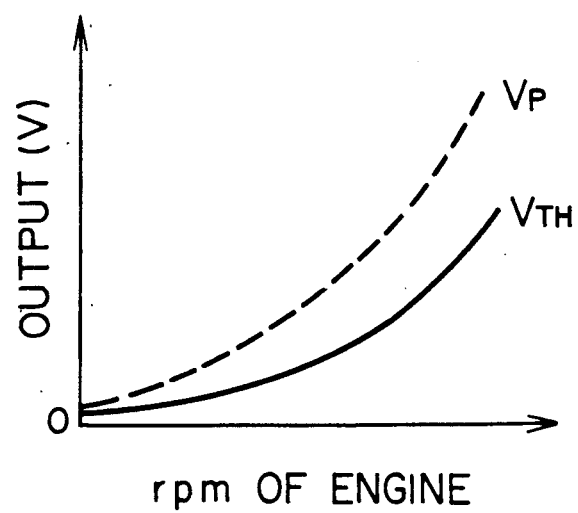
FIG. 4 is a graphic representation showing threshold-signal and peak-signal characteristics with respect to the number of revolutions per minute of the engine.

FIG. 4 shown th characteristics of the peak-hold signal $V_p$ and the knocking determination threshold signal $V_{TH}$ relative to he number of revolutions per minute of the engine with the same or constant intensity of knocking. As can be seen form these characteristics, the difference $V_K$ between the peak-hold signal $V_p$ and the knocking determination threshold signal $V_{TH}$ increases as the number of revolutions per minute of the engine increases. Therefore, if the modification quantity of retard angle $\Delta\theta_R$ is calculated using the above equation ($\Delta\theta_R = V_K \times L = (V_p - V_{TH}) \times L$), the modification quantity of retard angle $\Delta\theta_R$ at the same or constant knocking intensity grows larger as the number of revolutions per minute of the engine increases, resulting in improper ignition timing control. Accordingly, in order to achieve better controllability on the ignition timing, it is recommended that the knocking determination threshold ($\Delta\theta_R = V_K \times L$) in Step S8 of FIG. 3. Should be replaced by another threshold ($\Delta\theta_R'$), as shown in Step S8A of FIG. 5, which is calculated based on the difference between the peak-hold signal $V_p$ and the knocking determination threshold signal $V_{TH}$, and a threshold modification coefficient ($L'/V_{TH}$) which is obtained by normalizing a constant value $L'$ by the knocking determination threshold $V_{TH}$, in he following manner:

$$\Delta\theta_R = V_R \times (L'/V_{TH}) = (V_p - V_{TH}) \times (L'/V_{TH}).$$

Figure 6A:
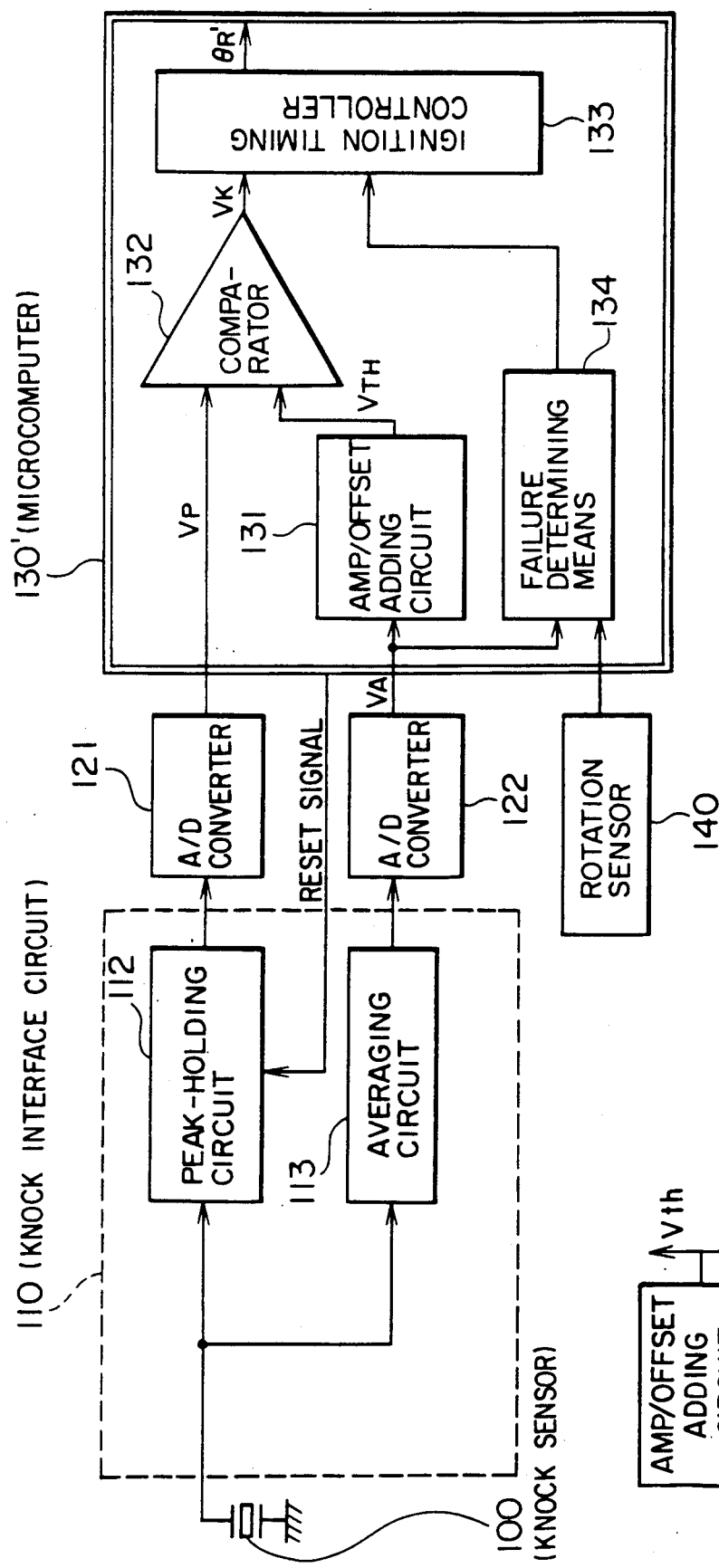
FIG. 6A is a view similar to FIG. 1, but showing another of the present invention.

FIG. 6A shows another embodiment of the present invention which is substantially similar in construction and operation except for the feature that a microcomputer 130' includes, in addition to an amp/offset adding means 131, a comparator 132 and an ignition timing controller 133 in the form of a retard angle modifying means all of which are the same as those employed in the previous embodiment of FIG. 1, a failure determining means 134 for determining whether there is a failure in a knock sensor 100. More specifically, the failure determining means 134 is connected to receive the average signal $V_A$ of the second A/D converter 122 and the output signal of a rotation sensor 140, which senses the number of revolutions per minute of the engine, for comparing the average signal $V_A$ with a prescribed reference level for determining whether the knock sensor 100 is in failure and outputting a failure signal to the retard angle modifying is determined that there is a failure in the knock sensor 100. In other respects, the knocking suppression operation of this embodiment is substantially the same as that carried out by the previous embodiment.

Figure 7:
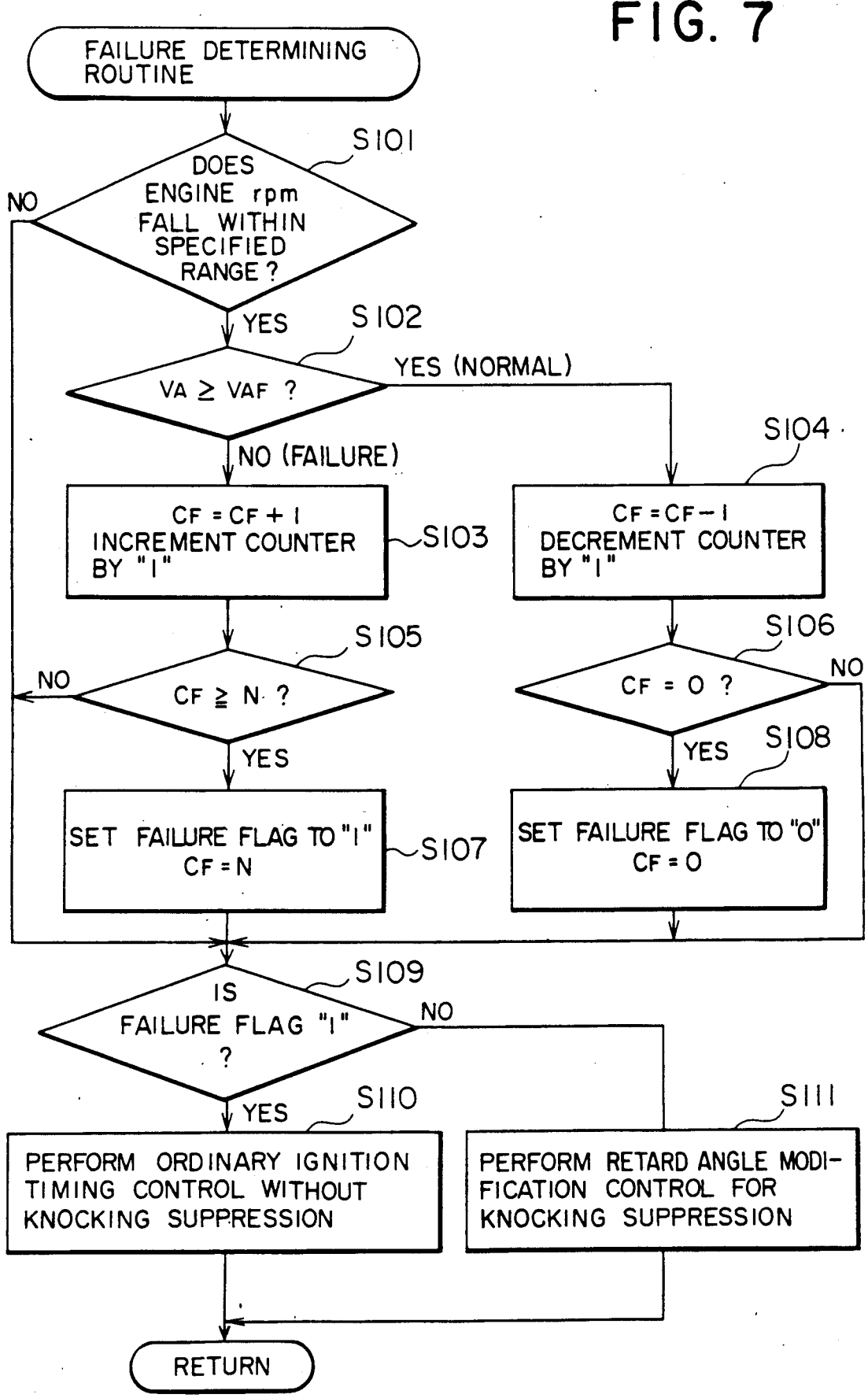
FIG. 7 is a flow chart showing the operation control program executed by a microcomputer of FIG. 6.
Figure 8:
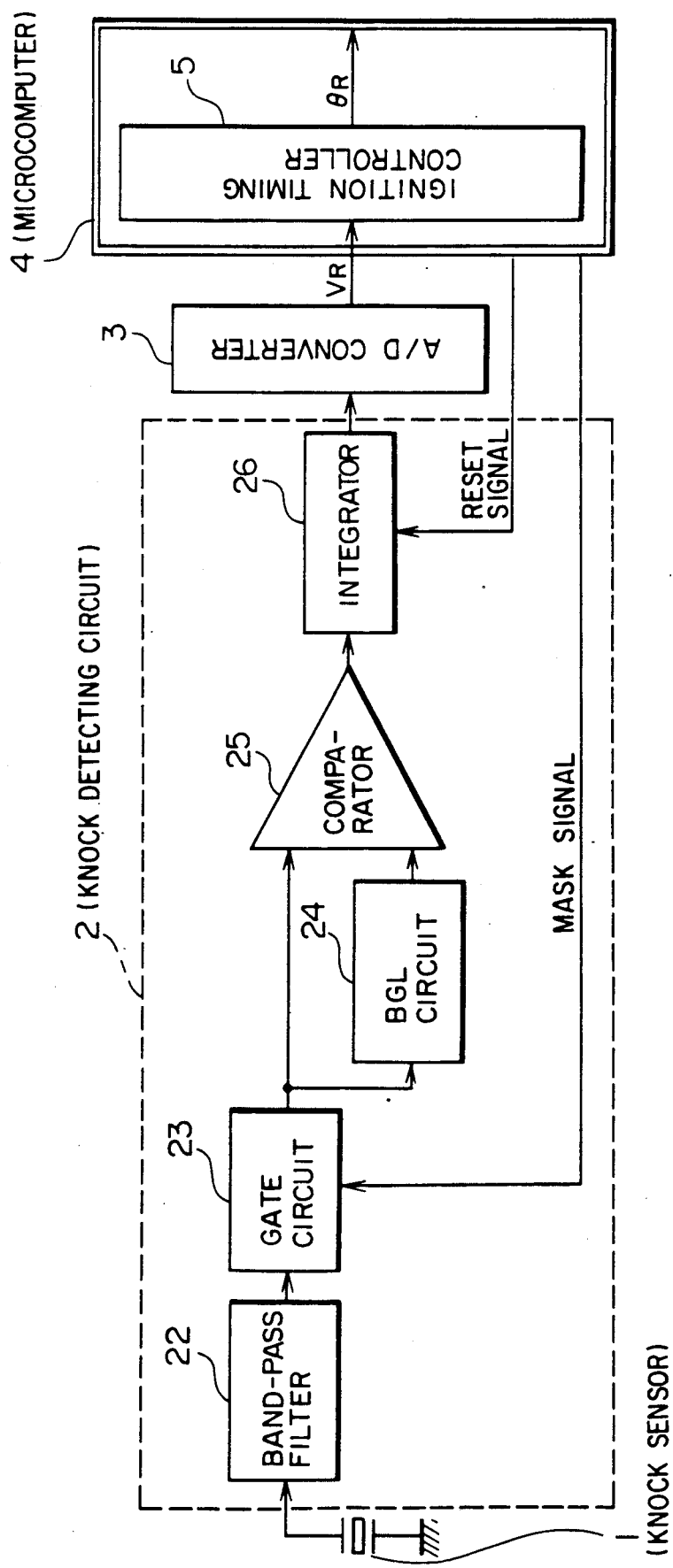
FIG. 8 is a block diagram of a conventional knocking suppression apparatus for an internal combustion engine.

Now, the failure determining operation of this embodiment will be described with particular reference to FIG. 7 which illustrates the consecutive process steps of a control program executed by the microcomputer 130' of FIG. 6A.

Figure 5:
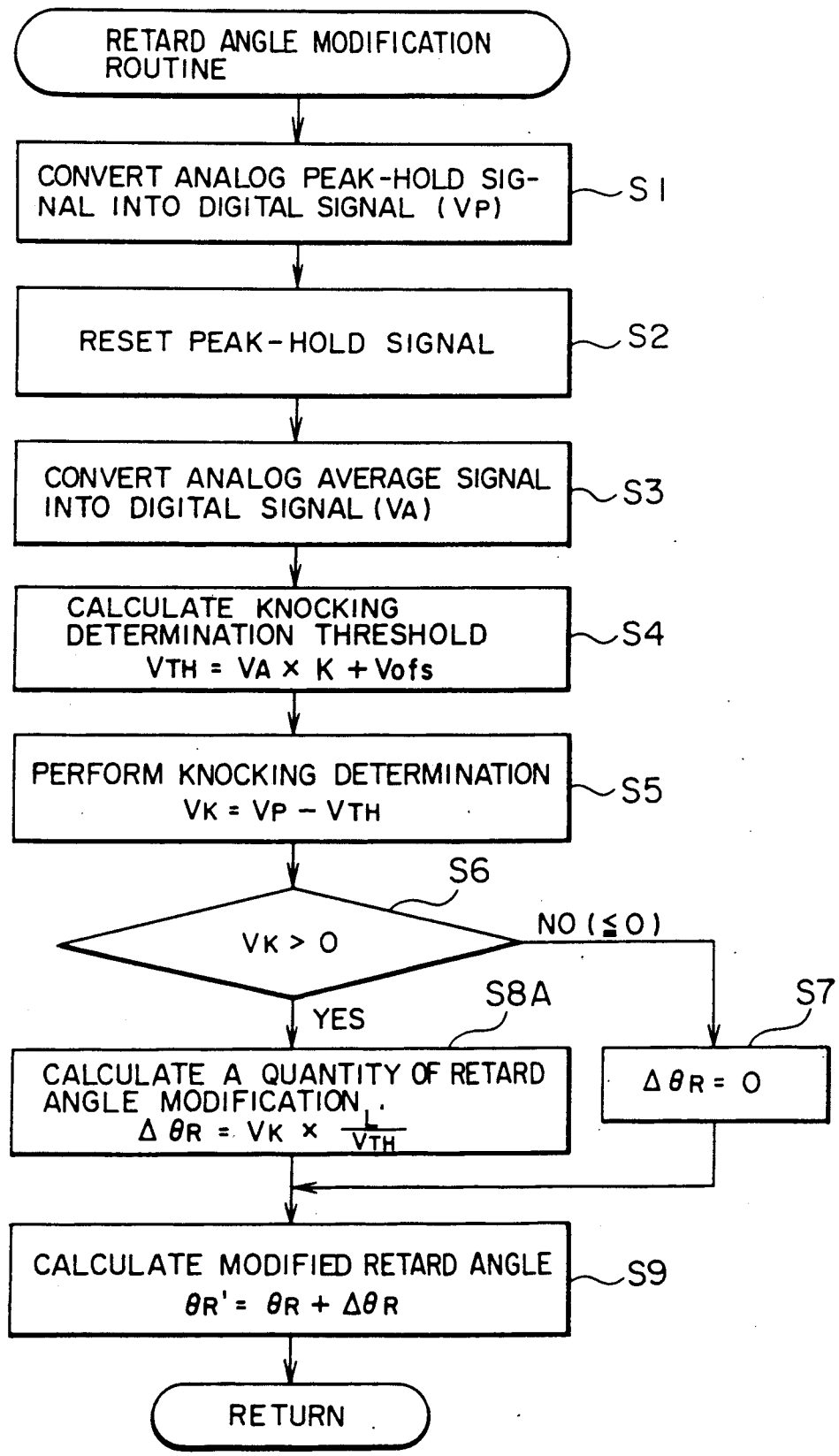
FIG. 5 is a flow chart showing the operation of another control program executed by the microcomputer of FIG. 1.

First, in Step S101, based on the output signal of the rotation sensor 140, the failure determining means 134 determines whether the number of revolutions per minute of the engine as sensed by the rotation sensor 140 falls within a specific rpm range. If the answer is "NO", then the program goes to Step S109. On the other hand, if the answer is "YES", the program goes to Step S102 where the failure determining means 134 compares the average signal $V_A$ from the second A/D converter 122 with the prescribed reference level $V_{AF}$. If the average signal $V_A$ is less than the prescribed reference level $V_{AF}$, it is determined that there may be a failure in the knock sensor 100, and then the program goes to Step S103 where the number $C_F$ counted by a failure counter (not shown), which may be built in the failure determining means 134 for counting how many failures ($V_{AF} > V_A$) in the knock sensor 100 are determined in Step S102, is incremented by 1 to make $C_{F+1}$ (i.e., $C_{F+1} = C_F + 1$). Subsequently, in Step S105, it is determined whether the counted number $C_{F+1}$ is equal to or greater than a prescribed number N. If the answer is "NO", the program goes to Step S109. If, however, the answer is "YES" in Step S105, then in Step S107 a failure flag is set to "1" and at the same time the counted number $C_{F+1}$ is set to N. Thereafter, the program goes to Step S109 where it is determined whether the failure flag is "1". If the answer is "YES", then the program goes to Step S110 where instead of doing knocking suppression control based on the output signal of the knock sensor 100, the retard angle modifying means 133 does a failure-time retard angle control (i.e., ordinary ignition timing control) without reflecting the knock sensor output. If, however, the answer is "NO" (i.e., the failure flag #1) in Step S109, the program goes to Step S111 where the normal retard angle modification control as illustrated in FIG. 3 or 5 is effected for knocking suppression. Thus, only after the failure determining means 134 has determined a knock sensor failure a prescribed number of times (e.g., N times in this embodiment) or thereover, the knocking suppression control on the ignition timing is terminated, and the ordinary ignition timing control without knocking suppression is effected instead.

On the other hand, in Step S102, if the average signal $V_A$ is equal to or greater than the prescribed reference level $V_A$, it is determined that the operation of the knock sensor 100 is normal and then the program goes to Step S104 where the number $C_F$ counted by the failure counter is decremented by 1, that is $C_{F-1} = C_F - 1$. Subsequently, in Step S106, it is determined whether the updated number $C_{F=1}$ is equal to zero ($C_{F-1} = 0$). If the answer is "YES", the program goes to Step S108 where the failure flag is cleared, and at the same time the failure counter is also cleared. Thereafter, the program goes to Step S109 where it is determined that the failure flag is not equal to 1, and thus the program goes to Step S111 where the normal retard angle modification control for knocking suppression is performed. Returning to Step S106, if it is determined that $C_F$ is not equal to 0, the program skips Step S108 and goes directly to Step S109 where it is determined whether the failure flag is equal to 1. If the answer is "YES", then in Step S110 the ordinary ignition timing control without knocking suppression is performed, but if the answer is "NO", then in Step S111 the normal retard angle modification control is performed. After Step S110 or S111, the program returns to Step S101. In this manner, a change between the ordinary ignition timing control and the retard angle modification control is effected only when the determination of a failure or non-failure in the knock sensor 100 has been made a predetermined number of times (i.e., N times). This serves to eliminate instantaneous or inadvertent errors in failure determination and hence enhance the reliability in such determination to a practical extent.

Although in the above embodiment, the average signal $V_A$ of the second A/D converter 122 is used in Step S102 for the purpose of determining a failure in the knock sensor 100, the knocking determination threshold $V_{TH}$ generated by the amp/offset adding means 131 may also be available inplace of the average signal $V_A$.

Figure 6B:
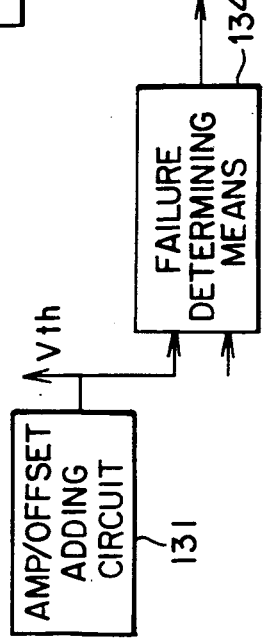
FIG. 6B is a view similar to FIG. 6A, but with feedback to the failure determining means.

FIG. 6B illustrates this embodiment, wherein a solid line indicates feeding the output signal $V_{TH}$ of the amp/offset adding circuit 131 of the failure determining means 134 rather than directly feeding the average signal $V_A$ into the failure determining means. In this case, in Step S102, comparison is made between the determination threshold $V_{THF}$ and a prescribed reference level $V_{THF}$ so as to determine whether the former is greater than the latter.

What is claimed is:

1. A knocking suppression apparatus for an internal combustion engine comprising;
    a knock sensor mounted on an engine for sensing knocking therein;
    a knock interface circuit connected to receive an output signal of said knock sensor for generating a peak-hold signal ($V_p$) representative of a peak in the knock sensor output signal and for generating an average signal ($V_A$) representative of an average of the knock sensor output signal; and
    a microcomputer including a threshold setting means for setting, based on the average signal ($V_A$), a threshold level ($V_{TH}$) for knocking determination,, a knocking determining means for making a comparison between the peak-hold signal ($V_p$) and the threshold level ($V_{TH}$) and determining, based on a result of the comparison, whether there is knocking int he engine, and an ignition timing controller for controlling ignition timing of the engine, said ignition timing controller including a retard angle modifying means for modifying the retard angle ($\theta_R$) based on an output signal ($V_K$) of said knocking determining means and retarding the ignition timing based on a modified retard angle ($\theta_R'$) so as to suppress the knocking,
    wherein said threshold determining means determines the threshold level ($V_{TH}$) as follows:

$$V_{TH} = V_A \times K + V_{ofs}$$

where K is a constant; and Vofs is an offset value.

2. The knocking suppression apparatus for an internal combustion engine according to claim 1, wherein said knocking determining means determines that there is knocking in the engine when the peak signal ($V_p$) is greater than the threshold signal ($V_{TH}$).

3. The knocking suppression apparatus for an internal combustion engine according to claim 1, wherein said retard angle control means calculates an appropriate quantity of retard angle modification ($\Delta\theta_R$) based on a difference ($V_K$) between the peak-hold signal ($V_p$) and the threshold signal ($V_{TH}$) as follows:

$$\Delta\theta_R = V_K \times L = (V_p - V_{TH}) \times L$$

where L is = a coefficient of modification.

4. The knocking suppression apparatus for an internal combustion engine according to claim 3, wherein said retard angle control means modifies the retard angle ($\theta_R$) in the following manner to provide the modified retard angle ($\theta_R'$):

$$\theta_R' = \theta_R + \Delta\theta_R.$$

5. The knocking suppression apparatus for an internal combustion engine according to claim 1, wherein a difference ($V_K$) between the peak-hold signal ($V_p$) and the threshold signal ($V_{TH}$) increases as the number of revolutions per minute of the engine increases, and said retard angle control means calculates an appropriate quantity of retard angle modification ($\Delta\theta_R$) by normalizing the difference ($V_K$) by the threshold signal ($V_{TH}$) as follows:

$$\Delta\theta_R = V_K \times (L'/v_{TH}) = (V_p - V_{TH}) \times L'/V_{TH}$$

where L' is = a coefficient of modification.

6. The knocking suppression apparatus for an internal combustion engine according to claim 5, wherein said retard angel control means modifies the retard angle ($\theta_R$) in the following manner to provide the modified retard angle ($\theta_R'$):

$$\theta_R' = \theta_R + \Delta\theta_R.$$

7. The knocking suppression apparatus for an internal combustion engine according claim 1, wherein said knock interface circuit comprises:
    a peak holding circuit connected to said knock sensor for outputting the peak-hold signal ($V_p$) to said knocking determining means through a first A/D converter; and
    an averaging circuit connected to said knock sensor for outputting the average signal ($V_A$) to said threshold setting means through a second A/D converter.

8. A knocking suppression apparatus for an internal combustion engine comprising;
    a knock sensor mounted on an engine for sensing knocking therein;
    a knock interface circuit connected to receive an output signal of said knock sensor for generating a peak-hold signal ($V_p$) representative of a peak in the knock sensor output signal and for generating an average signal ($V_A$) representative of an average of the knock sensor output signal; and
    a microcomputer including a threshold setting means for setting, based on the average signal ($V_A$), a threshold level ($V_{TH}$) for knocking determination, a knocking determining means for making a comparison between the peak-hold signal ($V_p$) and the threshold level ($V_{TH}$) and determining, based on a result of the comparison, whether there is knocking int he engine, an ignition timing controller for controlling ignition timing of the engine, said ignition timing controller including a retard angle modifying means for modifying the reared angle ($\theta_R$) based on an output signal ($V_K$) of said knocking determining means and retarding the ignition timing based on a modified retard angle ($\theta_R'$) so as to suppress the knocking, and a failure determining means for determining whether there is a failure in said knock sensor, wherein said failure determining means is connected to receive the threshold signal ($V_{TH}$) of said threshold determining means and determines that there is a failure in said knock sensor when the threshold signal ($V_{TH}$) is less than a prescribed reference level ($V_{AF}$).

9. The knocking suppression apparatus for an internal combustion engine according to claim 8, wherein said failure determining means is connected to receive the average signal ($V_A$) of said averaging means and determines that there is a failure in said knock sensor when the average signal ($V_A$) is less than a prescribed reference level ($V_{AF}$).

10. The knocking suppression apparatus for an internal combustion engine according to claim 9, further comprising a rotation sensor for sensing a number of revolutions per minute of the engine, wherein said failure determining means performs failure determination only when the number of revolutions per minute of the engine as sensed by said rotation sensor falls within a specified range.

11. The knocking suppression apparatus for an internal combustion engine according to claim 8, wherein said retard angle modifying means stops reared angel modification when said failure determining means determines that there is a failure in said knock sensor.

12. The knocking suppression apparatus for an internal combustion engine according claim 8, wherein said reared angle modifying means stops the retard angle modificationonly after said failure determining means determines a prescribed number of times that there is a failure in said knock sensor.

13. The knocking suppression apparatus for an infernal combustion engine according to claim 8, further comprising a rotation sensor for sensing the number of revolutions per minute of the engine, wherein said failure determining means performs the failure determination only when the number of revolutions per minute of the engine as·sensed by said rotation sensor falls within a specified range.

* * * * *